US012669451B2

(12) United States Patent
Ota

(10) Patent No.: US 12,669,451 B2
(45) Date of Patent: Jun. 30, 2026

(54) CORRECTION APPARATUS, CORRECTION METHOD, AND CORRECTION PROGRAM

(71) Applicant: Rigaku Corporation, Tokyo (JP)

(72) Inventor: Takumi Ota, Tokyo (JP)

(73) Assignee: RIGAKU CORPORATION, Tokyo (JP)

( * ) Notice: Subject to any disclaimer, the term of this patent is extended or adjusted under 35 U.S.C. 154(b) by 150 days.

(21) Appl. No.: 18/888,206

(22) Filed: Sep. 18, 2024

(65) Prior Publication Data

US 2025/0093284 A1 Mar. 20, 2025

(30) Foreign Application Priority Data

Sep. 19, 2023 (JP) ................................. 2023-151710

(51) Int. Cl.
*G01N 23/00* (2006.01)
*G01N 23/207* (2018.01)

(52) U.S. Cl.
CPC ....... *G01N 23/207* (2013.01); *G01N 2223/62* (2013.01)

(58) Field of Classification Search
CPC .......................... G01N 2223/62; G01N 23/207
See application file for complete search history.

(56) References Cited

U.S. PATENT DOCUMENTS

2023/0152248 A1* 5/2023 Kikuchi .............. G01N 23/207
378/81

FOREIGN PATENT DOCUMENTS

JP 2019-087042 A 6/2019
WO 2015/119056 A1 8/2015

* cited by examiner

*Primary Examiner* — Dani Fox
(74) *Attorney, Agent, or Firm* — XSENSUS LLP

(57) ABSTRACT

A correction apparatus reduces time and labor, reduces an artificiality, and improves reproducibility of correction by correcting a shift of a profile with an automatically estimated correction amount. A correction apparatus for correcting a profile of X-ray powder diffraction comprises processing circuitry configured to set a reference profile, set an estimation method for estimating a correction amount related to a sample height, estimate the correction amount based on the estimation method, and correct a subject profile based on the correction amount, wherein the correction amount is a value that maximizes a degree of coincidence between the corrected subject profile and the reference profile.

13 Claims, 12 Drawing Sheets

610

620

EACH ROW IS                    COEFFICIENT MATRIX           BASIS MATRIX
MEASUREMENT PROFILE    (WEIGHT OF BASIS VECTOR)    (EACH ROW IS BASIS VECTOR)

BASIS MATRIX                                    BASIS MATRIX
        COEFFICIENT MATRIX                      COEFFICIENT MATRIX

MULTIPLE DATA WITH DEVIATION IN
PEAK POSITION

ATTRIBUTED TO MULTIPLE PROFILES

EXECUTION OF
DECOMPOSITION

MULTIPLE DATA WITHOUT
DEVIATION IN PEAK POSITION

ATTRIBUTE TO PROFILE TO BE
ATTRIBUTED

EXECUTION OF
DECOMPOSITION

| CRYSTALLINE PHASE NAME ▲ | base_profile_2_pm100um.rasx |
|---|---|
| Anatase, syn | |
| WEIGHT FRACTION | 75.46(15) |
| calcite | |
| WEIGHT FRACTION | 17.27(14) |
| Rutile, syn | |
| WEIGHT FRACTION | 7.27(9) |

| CRYSTALLINE PHASE NAME ▲ | base_profile_2.rasx |
|---|---|
| Anatase, syn | |
| WEIGHT FRACTION | 88.2(2) |
| calcite | |
| WEIGHT FRACTION | 11.36(13) |
| Rutile, syn | |
| WEIGHT FRACTION | 0.40(18) |

910

CORRECTION APPARATUS, CORRECTION METHOD, AND CORRECTION PROGRAM

CROSS-REFERENCE TO RELATED APPLICATION

This application claims priority from Japanese Patent Application No. 2023-151710 filed on Sep. 19, 2023, the entire contents of which are incorporated herein by reference.

FIELD

The present disclosure relates to a correction apparatus, correction method, and correction program for correcting a profile of X-ray powder diffraction.

BACKGROUND

Description of the Related Art

In the X-ray diffraction measurement for a powder sample, a powder sample filled in a recessed portion of a sample holder is used. The sample filling operation is difficult to reproduce even for the same operator. Further, the reproducibility varies depending on the skill level of the operator. When the position of the sample surface at the time of filling is different from the upper surface of the sample holder which is the reference position, the angular position of the profile to be measured is shifted from the original angular position (see Patent Document 1).

Qualitative analysis and machine learning are examples of the analysis which are sensitive to the peak position. In the qualitative analysis, when a peak shift of the measurement profile occurs, it leads to a problem in which a correct qualitative result cannot be obtained because the degree of coincidence between the peak position of the measurement profile and the peak position recorded in the database becomes low. In machine learning, it is required to input highly accurate information as training data. Therefore, if the measurement profile in which the peak shift has occurred is used as input data, the learning cannot be performed properly, and the inference result may also be erroneous.

Component decomposition may be used as a preprocessing for qualitative analysis and machine learning. Component decomposition is an algorithm that decomposes a measurement profile into profiles of different factors (see Patent Document 2), and the decomposed profile can be used for qualitative analysis or machine learning. It is known that when component analysis is performed using a plurality of peak-shifted profiles, the accuracy of component analysis is reduced. In this case, there arises a problem that the peak position of the decomposed profile deviates from the originally expected position, and there is a possibility that the result of the qualitative analysis or the machine learning is incorrect.

PATENT DOCUMENT

Patent Document 1: JP2015-119056A
Patent Document 2: JP2019-087042A

SUMMARY

In some cases, a method of directly adjusting the sample to a reference position is adopted for the above-described deviation of the sample surface. For example, a uniform sample can be prepared using a machine such as a machine press. However, such physical adjustment may be difficult, and this is not always sufficient as a countermeasure.

It is also conceivable that the user visually corrects the deviation of the sample position on the software with respect to the measurement profile shift. FIG. 12 is a diagram showing a dialog box used in correcting a sample position. For example, in the design shown in FIG. 12, when the value is changed in the slider bar or the text box in the operation area 910, the corrected profile is displayed on the viewer.

When the correction amount D of the sample surface height is applied to the X-ray diffraction apparatus having the goniometer radius R, the corrected diffraction angle 2θcorr is expressed by formula (1). When the deviation of the sample position is corrected by software at the time of analysis, the correction corresponds to replacing the angle 2θ with the angle 2θcorr.

$$2\theta_{corr} = 2\theta - (2D/R)\cos\theta \qquad (1)$$

However, in recent years, there has been an increasing opportunity to perform qualitative and quantitative analysis using machine learning, and it is necessary to process a large amount of data as training data. Such a method requires a lot of time and effort when processing a large amount of data. Further, in assuming the user's operation, the analysis is performed based on the artificial result, and objectivity is impaired. Since the correction depends on the skill of the user, there may also be a problem that the reproducibility is insufficient.

The present disclosure has been made in view of such circumstances, and an object of the present disclosure is to provide a correction apparatus, correction method and correction program capable of reducing time and labor, reducing an artificiality, and improving reproducibility of correction by correcting a shift of a profile with an automatically estimated correction amount.

(1) In an exemplary embodiment, the correction apparatus of the present disclosure is a correction apparatus for correcting a profile of X-ray powder diffraction, and comprises a reference profile setting section for setting a reference profile, an estimation method setting section for setting an estimation method for estimating a correction amount related to a sample height, a correction amount estimating section for estimating the correction amount based on the estimation method, and a correction section for correcting a subject profile based on the correction amount, wherein the correction amount is a value that maximizes a degree of coincidence between the corrected subject profile and the reference profile.

(2) Further, the correction apparatus according to (1) further comprises a temporary correction section for correcting the subject profile with a temporary correction amount, wherein the correction amount estimating section calculates the correction amount by repeating evaluation of a degree of coincidence between the subject profile corrected based on the temporary correction amount and the reference profile.

(3) Further, in the correction apparatus according to (1) or (2), the reference profile setting section sets the reference profile based on a profile designated by a user.

(4) In the correction apparatus according to any one of (1) to (3), the reference profile setting section sets the reference profile calculated based on a plurality of profiles.

(5) In the correction apparatus according to any one of (1) to (4), the estimation method setting section sets a least-square method or a peak-top method as the estimation method.

(6) Further, in the correction apparatus according to any one of (1) to (5), the estimation method setting section sets a 2θ angle range in which the degree of coincidence is maximized based on a designation of a user.

(7) Further, in the correction apparatus according to any one of (1) to (6), further comprising a display section that displays a profile obtained by correcting the subject profile based on the temporary correction amount or the correction amount.

(8) Further, in the correction apparatus according to (2), further comprises a display section for displaying a profile obtained by correcting the subject profile based on the temporary correction amount.

(9) Further, in the correction apparatus according to any one of (1) to (7), the following formula (1) is used based on the goniometer radius R and the correction amount D relating to the sample height when the angle 2θ of the profile is converted into the corrected angle 2θcorr.

$$2\theta_{corr} = 2\theta - (2D/R)\cos\theta \qquad (1)$$

(10) Further, in the correction apparatus according to any one of (1) to (8), a target of qualitative analysis is generated by correcting the subject profile based on the correction amount.

(11) Further, in the correction apparatus according to any one of (1) to (9), a target of component decomposition is generated by correcting the subject profile based on the correction amount.

(12) Further, the correction method of the present disclosure is a correction method for correcting a profile of X-ray powder diffraction, and comprises the steps of setting a reference profile, setting an estimation method for estimating a correction amount related to a sample height, estimating the correction amount based on the estimation method, and correcting a subject profile based on the correction amount, wherein the correction amount is a value that maximizes a degree of coincidence between the corrected subject profile and the reference profile.

(13) Further, the correction program of the present disclosure is a correction program for correcting a profile of X-ray powder diffraction, and causes a computer to execute the processes of setting a reference profile, setting an estimation method for estimating a correction amount related to a sample height, estimating the correction amount based on the estimation method, and correcting a subject profile based on the correction amount, wherein the correction amount is a value that maximizes a degree of coincidence between the corrected subject profile and the reference profile.

DETAILED DESCRIPTION

Figure 1:
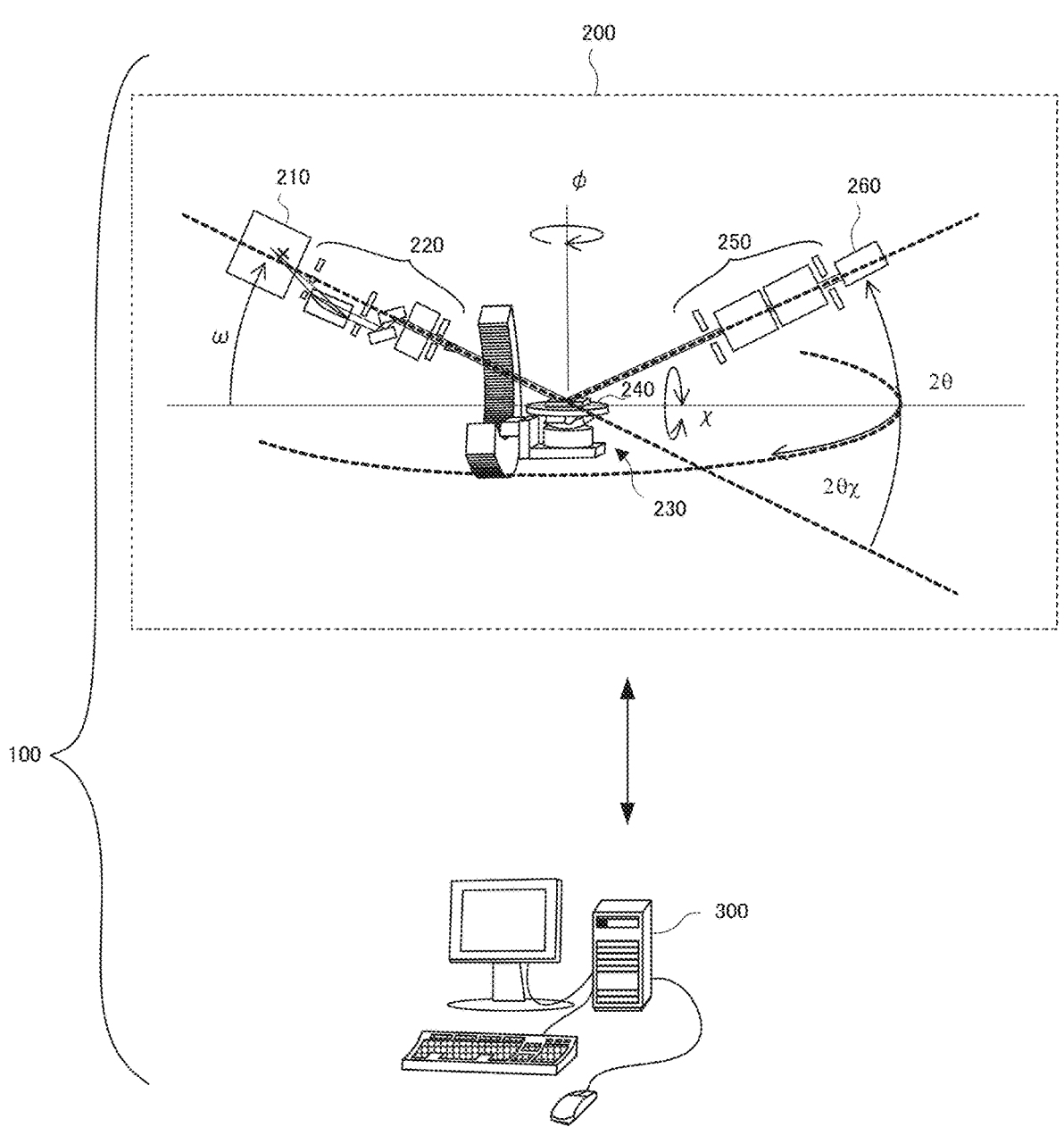
FIG. 1 is a schematic diagram showing an example of the configuration of the X-ray diffraction measurement system.

Next, embodiments of the present disclosure are described with reference to the drawings. To facilitate understanding of the description, the same reference numerals are assigned to the same components in the respective drawings, and duplicate descriptions are omitted.

[X-Ray Diffraction Measurement System]

FIG. 1 is a schematic diagram showing an example of the configuration of the X-ray diffraction measurement system 100. The X-ray diffraction measurement system 100 comprises an X-ray diffraction apparatus 200 and a control apparatus 300. The X-ray diffraction apparatus 200 makes X-rays incident on a sample and constitutes an optical system for detecting diffracted X-rays generated by the sample, and the optical system comprises a goniometer. Incidentally, the configuration shown in FIG. 1 is one example, and thus a variety of other configurations may be adopted.

The control apparatus 300 is connected to the X-ray diffraction apparatus 200 and controls the X-ray diffraction apparatus 200 and processes and stores the acquired data. The control apparatus 300 comprises a correction apparatus 400 as a function, and the correction apparatus 400 corrects a profile measured by X-ray powder diffraction. The control apparatus 300 is an apparatus comprising CPU and a memory and may be a PC terminal or a server on a cloud. Not only the whole apparatus but also part of the apparatus or some functions of the apparatus may be provided on the cloud. The input device 510 is, for example, a keyboard or a mouse, and accepts selection and designation by a user, and performs input to the control apparatus 300 and the correction apparatus 400. The display device 520 is, for example, a display and displays a measurement profile, a UI for estimating correction values or the like.

By using such an X-ray diffraction measurement system 100, the profile of the X-ray powder diffraction can be measured, and the measurement profile can be corrected. In addition, component decomposition can be performed using the corrected profile, and qualitative analysis and quantitative analysis can be performed.

Figure 2:
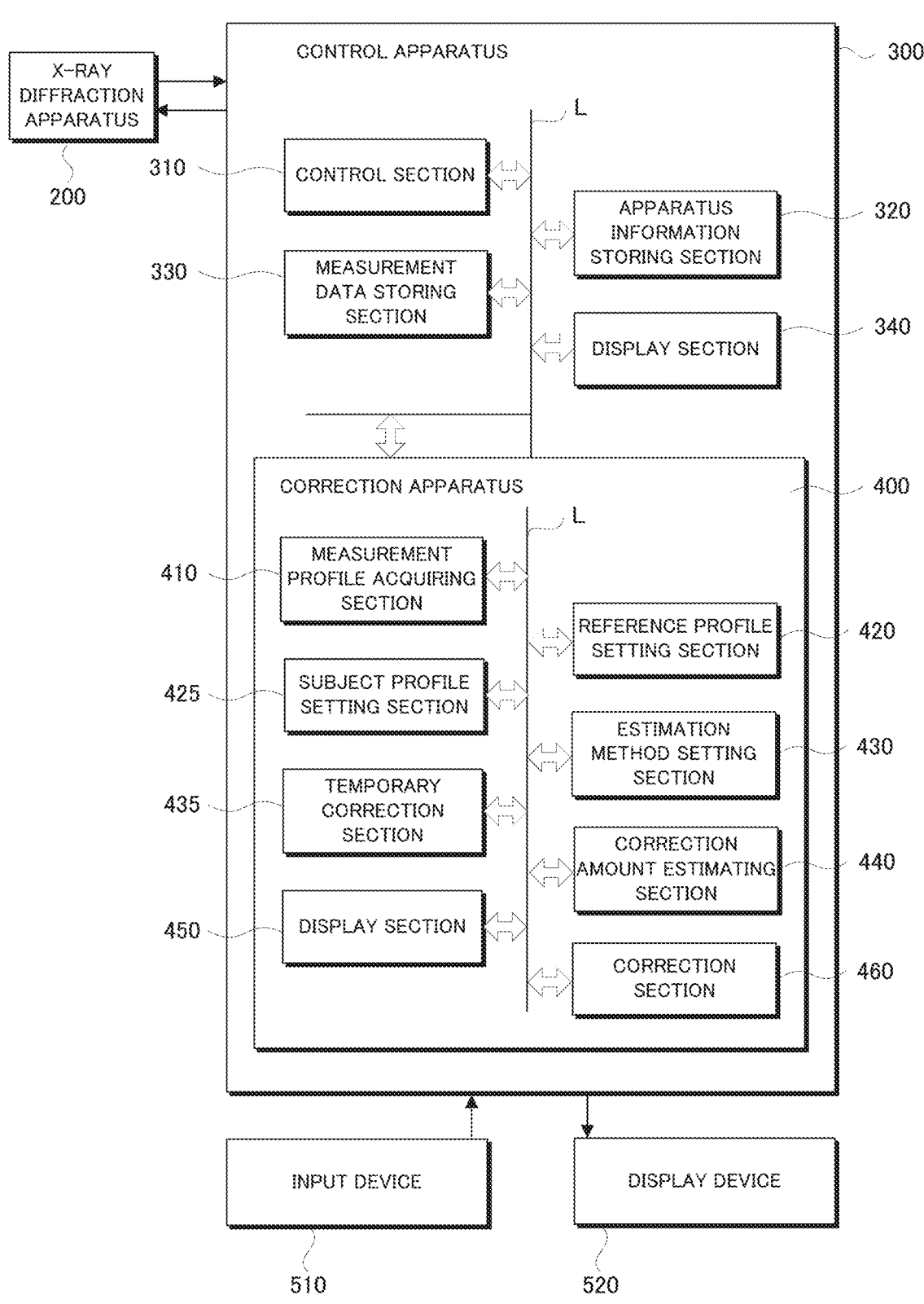
FIG. 2 is a block diagram showing an example of the configuration of the control apparatus.
Figure 3:
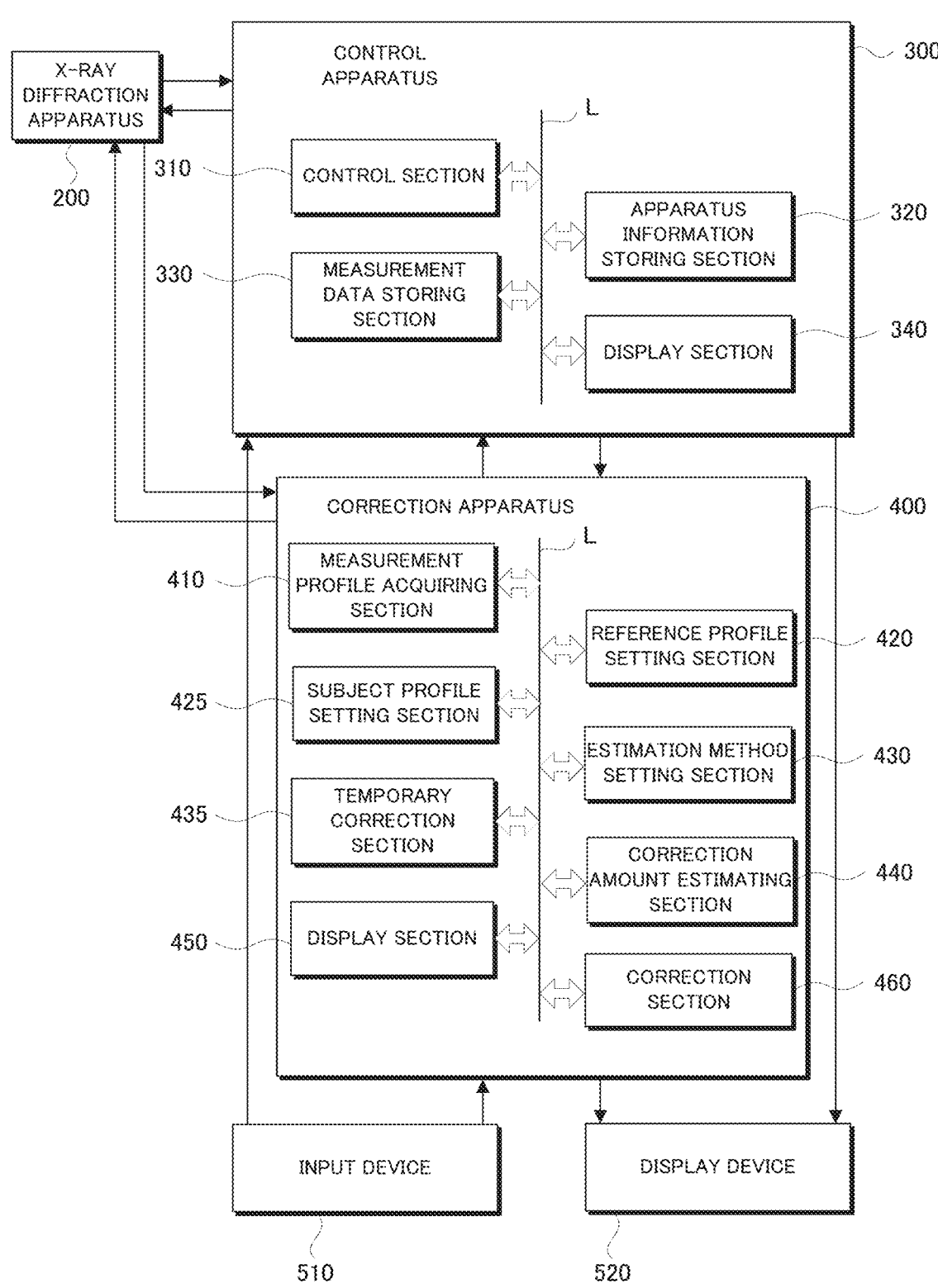
FIG. 3 is a block diagram showing a modified example of the configuration of the correction apparatus.
Figure 4:
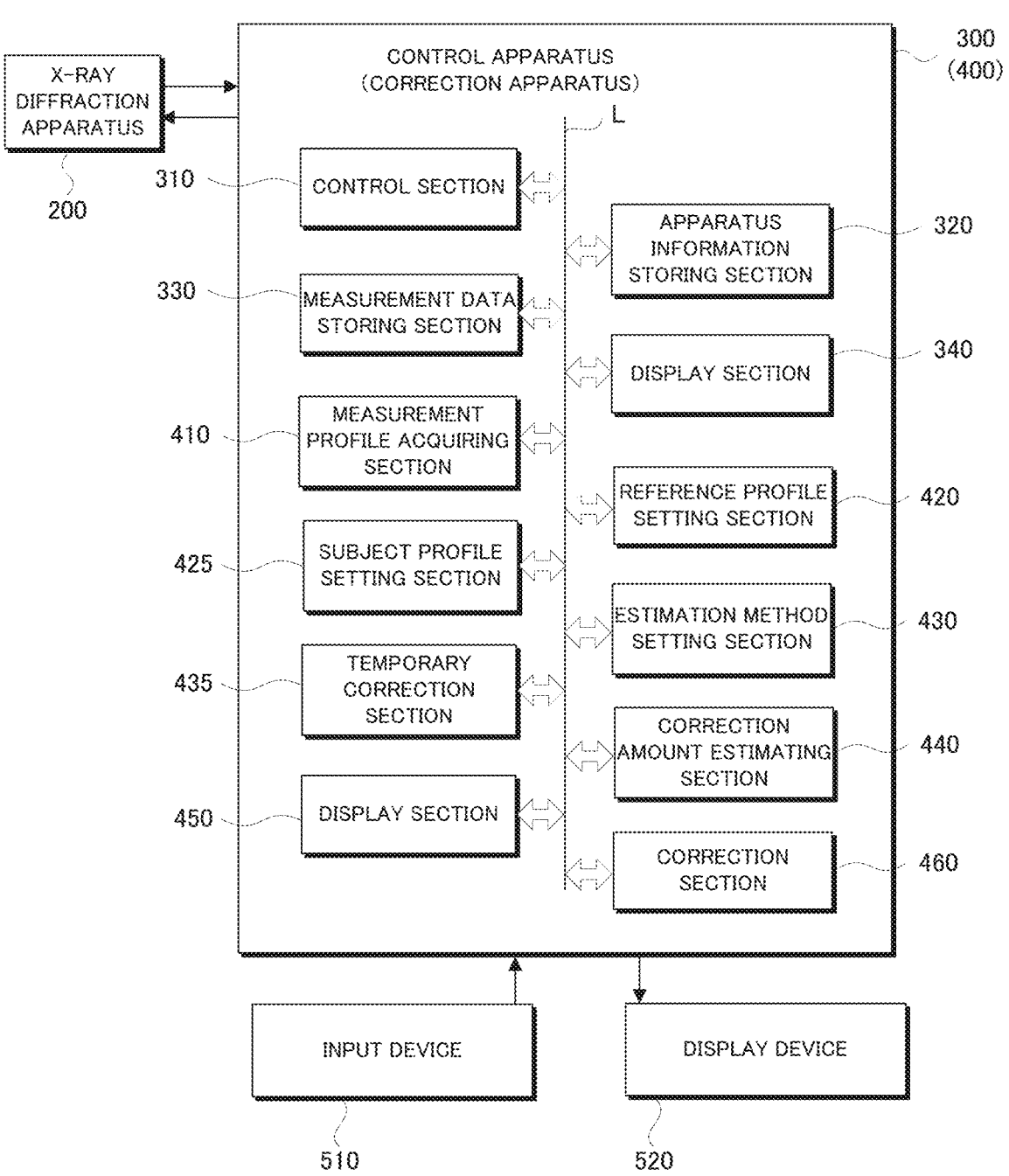
FIG. 4 is a block diagram showing a modified example of the configuration of the correction apparatus.

In the method of the present disclosure, the measurement profile is acquired and corrected independently of the X-ray diffraction apparatus 200 and the control apparatus 300. FIG. 2 is a block diagram showing an example of the configuration of the control apparatus. FIG. 3 is a block diagram showing a modified example of the configuration of the correction apparatus. FIG. 4 is a block diagram showing a modified example of the configuration of the correction apparatus.

As shown in FIG. 2, the correction apparatus 400 may be configured as a part of functions included in the control apparatus 300, or as shown in FIG. 3, the correction apparatus 400 may be configured as an apparatus different from the control apparatus 300. As shown in FIG. 4, the correction apparatus 400 and the control apparatus 300 may be configured as an integrated apparatus.

[X-Ray Diffraction Apparatus]

The X-ray diffraction apparatus 200 comprises an X-ray generation section 210 that generates X-rays from an X-ray focus, that is, an X-ray source, an incident side optical unit 220; a goniometer 230, a sample stage 240 where a sample is set, an emitting side optical unit 250 and a detector 260 that detects X-rays. The X-ray generation section 210, the incident side optical unit 220, the goniometer 230, the sample stage 240, the emitting side optical unit 250 and the detector 260 each constituting the X-ray diffraction apparatus 200 may be generally available, and thus descriptions are omitted.

[Control Apparatus and Correction Apparatus]

[Control Apparatus]

The control apparatus 300 is constituted from a computer formed by connecting CPU (Central Processing Unit/Central Processor), ROM (Read Only Memory), RAM (Random Access Memory) and a memory to a bus. The control apparatus 300 is connected to the X-ray diffraction apparatus 200 to receive information.

The control apparatus 300 comprises a control section 310, an apparatus information storing section 320, a measurement data storing section 330 and a (control apparatus side) display section 340. Each section can transmit and receive information via the control bus L. The input device 510 and the display device 520 are connected to CPU via an appropriate interface.

The control section 310 controls the operations of the X-ray diffraction apparatus 200. The apparatus information storing section 320 stores apparatus information obtained from the X-ray diffraction apparatus 200. The apparatus information includes information about the X-ray diffraction apparatus 200 such as name of the apparatus, the kind of a radiation source, the wavelength, the background and so forth. In addition, the type of the constituent elements, composition and the like of the sample may be included.

The measurement data storing section 330 stores the measurement profile acquired from the X-ray diffraction apparatus 200. In addition to the measurement profile, the type of radiation source, wavelength, background, type of constituent elements, composition of the sample and the like may be included. The display section 340 causes the display device 520 to display the measurement profile. Thus, the measurement profile can be confirmed by the user. Further, instruction and designation to the control apparatus 300, the correction apparatus 400 and so forth can be made based on the measurement data by the user.

The correction apparatus 400 corrects the profile of the X-ray powder diffraction. The correction apparatus 400 comprises a measurement profile acquiring section 410, a reference profile setting section 420, a subject profile setting section 425, an estimation method setting section 430, a temporary correction section 435, a correction amount estimating section 440, a (correction apparatus side) display section 450 and a correction section 460.

The measurement profile acquiring section 410 acquires a profile to be used for correction among the measurement profiles acquired from the X-ray diffraction apparatus 200 and stored. It is possible to acquire not only the subject profile to be corrected but also data that can be a reference profile. The reference profile is a profile to be used as a reference for putting the subject profile to be corrected close to, and a measurement profile in a case where the sample surface height matches the reference position may be used, or an average profile of a plurality of measurement profiles may be used. A reference profile can be obtained by using the above-described measurement profile even for a sample that does not include a crystalline phase with known angular positions.

The reference profile setting section 420 sets a reference profile. The reference profile setting section 420 can set a reference profile based on a profile designated by the user. Thus, a reference profile can be set even when the known information is little, and thus the correction can be performed. In a case where the reference profile is designated in advance, the reference profile may be set accordingly.

The reference profile setting section 420 can set a reference profile using a plurality of profiles. By setting a reference profile based on a plurality of profiles in this manner, variance can be eliminated, and further, a non-arbitrary reference profile can be generated.

The subject profile setting section 425 sets the subject profile based on the user's selection. In this case, it is possible that the subject profile is corrected by the set correction amount and displayed on the viewer.

The estimation method setting section 430 sets an estimation method for estimating a correction amount related to the sample height. The estimation method setting section 430 can set a least-square method or a peak-top method as an estimation optimization method. Thus, a reasonable correction amount can be estimated. As a method of optimizing the estimation, a method using a correlation coefficient may be adopted. The estimation method setting section 430 can also set the maximum value and the minimum value of the correction amount and the range of the diffraction angle used for estimation based on the user's designation or selection.

Note that the peak-top method is a method of minimizing the difference between the subject profile and the reference profile with respect to the position of the diffraction angle of the main peak. Among the peak-top methods, a method of minimizing a difference between positions of diffraction angles of a peaks having maximum intensity values of a subject profile and a reference profile is particularly referred to as a maximum intensity method.

The temporary correction section 435 corrects the subject profile with a temporary correction amount when a method that requires repetition trial, such as a least-square method or a method using a correlation coefficient, is selected as an estimation method. As a temporary correction amount, if the previous correction amount is known, a value assigned some different numerical values by using it as a reference can be adopted. Further, a likely value may be calculated using other methods, and a temporary correction amount may be set using this as a reference value. Note that the temporary correction section 435 does not operate when a method capable of estimating the correction amount by one calculation, such as the peak-top method, is selected. The "temporary correction amount" refers to a trial amount at the time of repetitive processing and is different from the "correction amount". "Correction amount" refers to an estimated amount that is ultimately determined by the method of the present disclosure.

The correction amount estimating section 440 estimates the correction amount based on the estimation method. The correction amount calculated using the set estimation method maximizes the degree of coincidence between the corrected subject profile and the reference profile. For example, when the least-square method is selected as the estimation method, the correction amount is calculated by repeating the evaluation of the degree of coincidence between the subject profile corrected based on the temporary correction amount and the reference profile, using the set correction amount as the temporary correction amount. When the peak-top method is selected as the estimation method, the correction amount estimating section 440 calculates the correction amount such that the difference between the peak position of the subject profile and the peak position of the reference profile is minimized. Thus, the deviation of the height position of the sample can be corrected based on the estimated correction amount. As a result, correction can be performed with reduced artificiality without taking time and labor, and further, reproducibility of correction can be improved. In this way, the value having the maximum degree of coincidence between the corrected subject profile and the reference profile is treated as the correction amount.

Here, the maximum degree of coincidence between the two profiles means that an evaluation function reaches the maximum or minimum when a value related to a difference between the two profiles is represented by the evaluation function. The evaluation function may be any index including an index such as a mean absolute error, a mean squared error, or a root mean squared error, which represents a difference, or an index such as a correlation coefficient, which represents a degree of coincidence. In the case of the peak-top method, a state in which the peak positions coincide with each other is referred to as a maximum degree of coincidence.

The correction amount estimating section 440 can estimate the correction amount in the set 2θ angle range. Thus, for example, since one peak-top of a certain crystalline phase can be used as a reference, the deviation of the height position of the sample can be accurately corrected with respect to a measurement profile of the sample in which a plurality of crystalline phases are included at various weight fractions.

The display section 450 displays a profile obtained by correcting the subject profile based on the provisional correction amount or the estimated correction amount. Thus, the user can perform correction while confirming the correction of the subject profile.

The correction section 460 corrects the subject profile based on the correction amount. At this time, the correction amount is a value that maximizes the degree of coincidence between the corrected subject profile and the reference profile. The correction amount is determined according to the set estimation method. When the correction of the subject profile by the temporary correction amount and the evaluation of the degree of coincidence are repeated, the profile corrected by the temporary correction amount may be stored, and the corresponding profile may be read out when the correction amount is determined.

The temporary correction section 435 and the correction section 460 can convert the angle 2θ of the subject profile into the angle 2θcorr after correction by the following formula (1) based on the goniometer radius R and the correction amount D related to the sample height.

$$2\theta_{corr} = 2\theta - (2D/R)\cos\theta \qquad (1)$$

[Correction Method]

Figure 5:
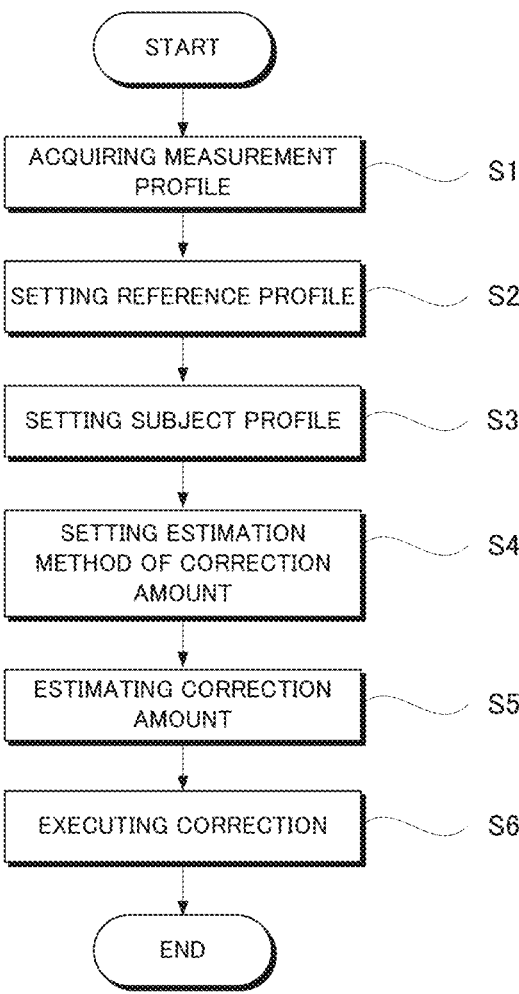
FIG. 5 is a flowchart showing an example of the operation of the correction apparatus.

Next, a correction method using the above-described correction apparatus 400 is described. FIG. 5 is a flowchart showing an example of the operation of the correction apparatus 400. First, a measurement profile to be used for correcting is acquired among measurement data that is acquired by X-ray diffraction measurement and stored (step S1).

The user selection is accepted, and the reference profile is set (step S2). A reference profile may be generated based on a plurality of measurement profiles, and the reference profile may be set. If the reference profile is designated in advance, the reference profile may be set accordingly. At the time of setting, the reference profile can be displayed on the viewer.

Then, selection and designation of the user are accepted, and the subject profile and the correction amount are set (step S3). In this case, it is possible that the selected subject profile is corrected by the specified correction amount and displayed on the viewer.

Selection of the user is accepted, and an estimation method of the correction amount is set (step S4). For example, the least-square method or the peak-top method (including the maximum intensity method) can be set as the optimization method. The correction amount is estimated by using the set estimation method of the correction amount (step S5). For example, in a case where the least-square method is selected, the processing is repeated so that the temporary correction profile obtained by correcting the subject profile with the temporary correction amount is close to the reference profile and is calculated as the estimated correction amount.

That is, when the least-square method is designated, the least-square method is performed so as to reduce the residual between the reference profile and the subject profile by changing the correction amount. When the maximum intensity method is designated, the correction amount is estimated so that the maximum intensity position of the reference profile matches the maximum intensity position of the subject profile. When the peak-top method is selected, the correction amount when the peak positions coincide is calculated. Then, correction of the subject profile is executed with the estimated correction amount (step S6), and the process is ended.

[User Interface]

Figure 6:
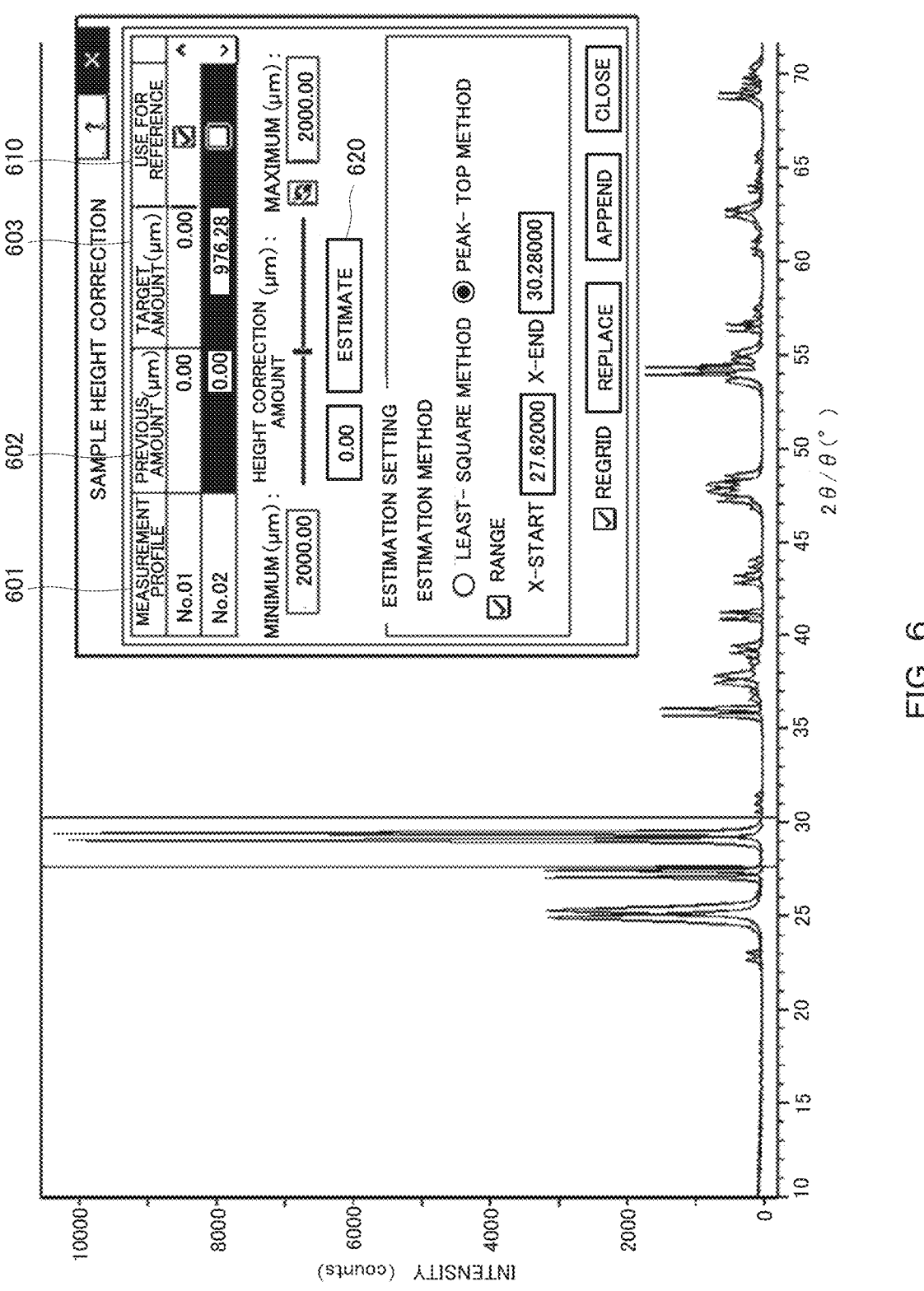
FIG. 6 is a diagram showing an exemplary UI used when preparing for estimating a correction amount.

A user interface used when correcting a profile is described below. FIG. 6 is a diagram showing an exemplary UI used when preparing for estimating a correction amount. In the dialog box shown in FIG. 6, the previous correction amount 602, the current correction amount 603 and the check box 610 are displayed for the profile name 601. In FIG. 6, the temporarily corrected subject profile is displayed on the viewer.

By leaving the display of the previous correction amount 602 as the previous amount, it is possible to recognize how much correction was made based on the sample height at the time of measurement as reference information. The checkbox 610 is a UI for accepting a user's selection of whether or not to use it as a reference profile. The measurement profile selected by the user is used to set the reference profile. Similar check boxes may be used when setting the subject profile. A measurement profile that is not selected as the reference profile may be set as the subject profile. In any case, it is possible that the subject profile is displayed in a specific manner in an easy-to-understand manner. For example, the color of a row can be changed and highlighted.

Note that the above description does not prevent one measurement profile from being set to both the reference profile and the subject profile. For example, if all measurement profiles are set to both the reference profile and the subject profile, the average profile of all measurement profiles is the reference profile. Then, corrections based on the reference profile are performed on all measurement profiles. In this method, the user does not need to explicitly designate the reference profile and the subject profile.

In the region of the estimation setting, the estimation method can be selected from among the least-square method and the peak-top method by using the radio button. In addition, a range of diffraction angles to which the estimation method is applied can be designated. When the estimation start button 620 is pressed, the process is transferred to an algorithm for estimating the correction amount.

Figure 7:
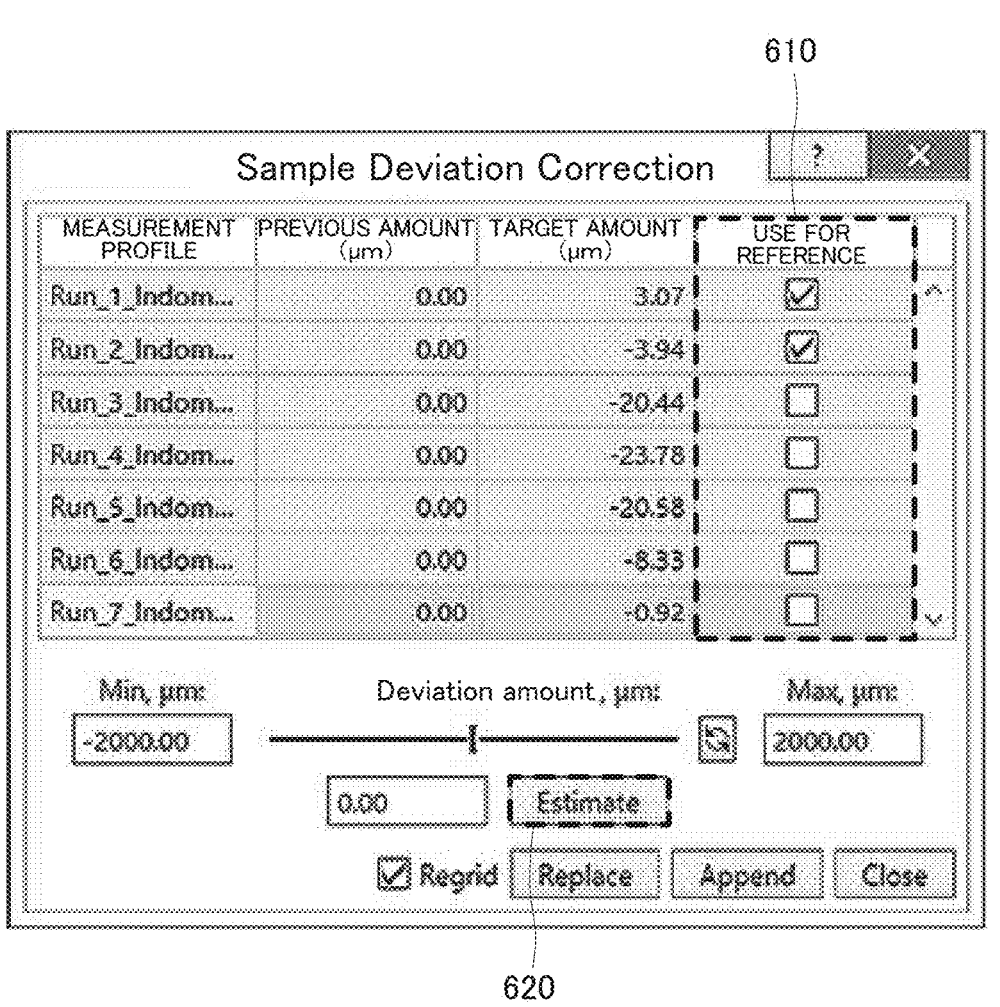
FIG. 7 is a diagram showing an exemplary UI used when setting a plurality of reference profiles.

FIG. 7 is a diagram showing an exemplary UI used when setting a plurality of reference profiles. When a plurality of profiles can be selected as the reference profile and a plurality of profiles are selected, for example, a profile composed of the selected profiles can be set as the reference profile. In that case, the average profile of the selected profiles can be used as the reference profile.

[Application to Qualitative and Quantitative Analysis]

The measurement profile of X-ray powder diffraction can be corrected for qualitative and quantitative analysis. As an object of qualitative analysis, it is possible to generate a corrected profile by correcting the subject profile based on the correction amount calculated according to the present disclosure. Thus, a qualitative analysis can be performed based on the correction profile, and a substance can be accurately identified. In addition, quantitative analysis can be performed by Rietveld analysis or the like using the correction profile.

(Component Decomposition)

If the profile or background of a plurality of substances is superimposed to form a measurement profile, it is possible to perform the component decomposition on the measurement profile. The component decomposition is the decomposition of the measurement profile of X-ray powder diffraction into a weighted sum of multiple profiles (including background profiles). This decomposed profile is called a basis profile. Since each profile and its weights are both non-negative values, non-negative matrix factorization is suitable for representing the measurement profile of X-ray powder diffraction as a weighted sum of a plurality of profiles. Basis profiles can also be used for qualitative and quantitative analyses.

Figure 8A:
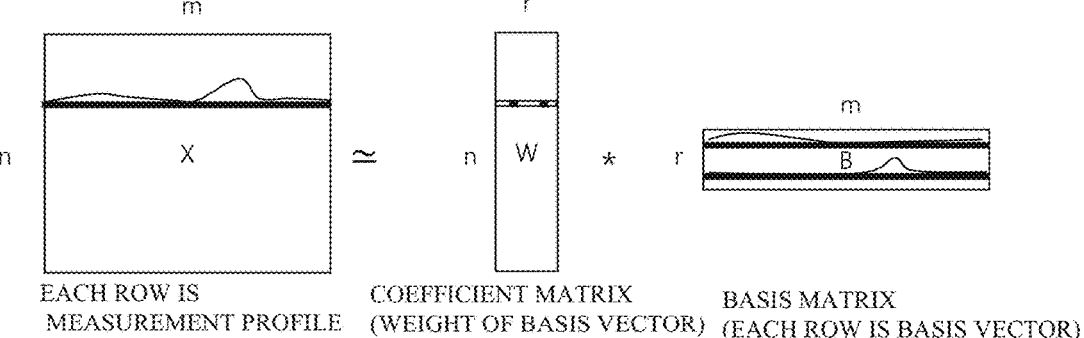
FIG. 8A and FIG. 8B are diagrams showing the manner of the non-negative matrix factorization and the manner of the non-negative matrix factorization when known information is included, respectively.

FIG. 8A is a conceptual diagram showing the manner of non-negative matrix factorization. The left side of FIG. 8A shows a matrix of n measurement profiles of X-ray powder diffraction with m measurement points. The result obtained by applying non-negative matrix factorization to the left side is the right side of the FIG. 8A. However, the equal symbol with waved line in FIGS. 8A and 8B includes not only an exact match but also a case where the degree of deviation indicating the degree of the neighborhood between the left side and the right side is a predetermined value or less. It is possible to use known information as a constraint and to apply non-negative matrix factorization to the measurement profile of the X-ray powder diffraction so that the constraint is satisfied.

Figure 8B:
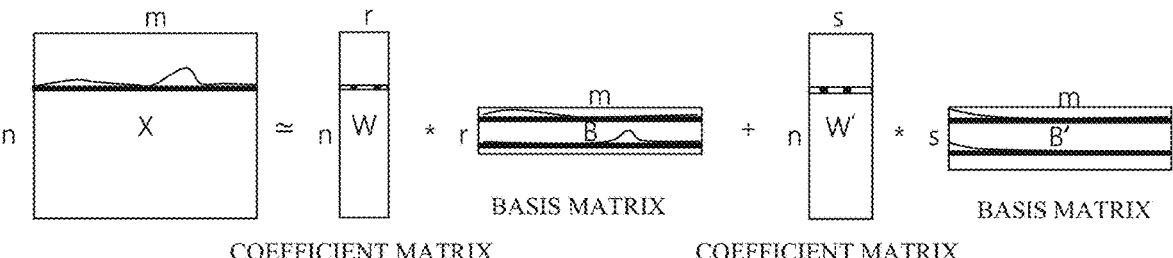

FIG. 8B is a conceptual diagram showing the manner of the non-negative matrix factorization when known information is included. If known information is included on the right side of FIG. 8A, the known information can be retrieved and represented, for example, as in the second term on the right side of FIG. 8B. The known data is set to one or more of a matrix W of n rows and r columns on the right side of FIG. 8B, a matrix W' of n rows and s columns or a matrix B' of s rows and m columns. The matrix W', W and B with r rows and m columns can be optimized under the constraint.

In such a component decomposition, it is important that the peak position of the measurement profile is accurate. In the present disclosure, it is possible to generate a target of component decomposition by correcting the subject profile based on the calculated correction amount. Thus, accurate component decomposition can be realized.

(Effect of Shift in Peak Position)

Figure 9A:
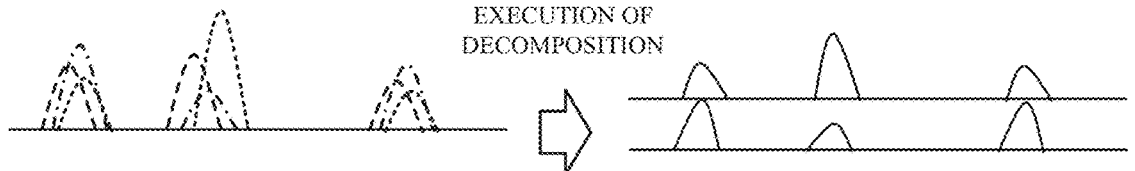
FIG. 9A and FIG. 9B are diagrams showing profiles where component decomposition was applied with and without a shift in peak position, respectively.
Figure 9B:
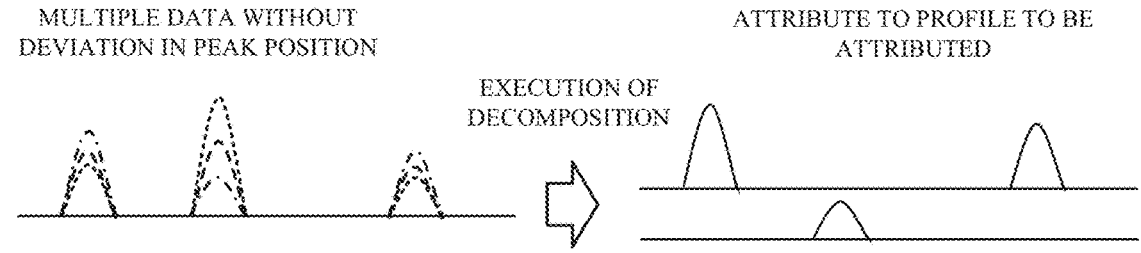

FIGS. 9A and 9B are diagrams showing profiles where component decomposition was applied with and without a shift in peak position, respectively. When a profile having a deviation in the angular position of a peak is decomposed, as shown in FIG. 9A, a peak, which should be attributed to one profile, is attributed to a plurality of profiles. On the other hand, when a profile in which there is no deviation in the angular position of the peak is decomposed, as shown in FIG. 9B, the peak of each substance is attributed to the profile to which the peak should be attributed.

(Machine Learning)

In the qualitative analysis using the machine learning, the learning of the neural network is performed using the training data in which the entire profile is input data, and the contained crystalline phases are inferred. The measurement profile is then input to the neural network and inference of the crystalline phase contained is performed. The height correction of the present disclosure can be used both during learning and during inference.

At the time of learning, a high-quality profile is required as the training data. When the simulation data is used as the training data, it is possible to generate a profile without height deviation, and the height correction of the present disclosure is not used. On the other hand, when the measurement data is used as the training data, it is possible to use the measurement data as the training data after correcting the height deviation of the measurement data.

At the time of inference, a measurement profile is used as input data. Therefore, it is possible to correct the height deviation of the measurement profile and then input the measurement profile to the neural network.

Although the above describes qualitative analysis using machine learning, machine learning can also be used for quantitative analysis and calculation of lattice constants. In the qualitative analysis, the output data is the crystalline phase contained in the sample, but in the quantitative analysis, the output data is the quantitative value of the crystalline phase contained, and in the calculation of the lattice constant, the output data is the lattice constant. In both cases, the handling of the profile, which is input data, is the same as in the case of qualitative analysis.

[Simulation 1]

Based on the above correction method, the profiles and the peak positions of the database in respective cases without correction and with correction were compared. First, a powder sample mixed with anatase, calcite and rutile were subjected to X-ray diffraction measure to prepare a measurement profile. Then, a measurement profile was generated when the height of the sample surface was shifted from the reference position by 100 μm.

Figure 10A:
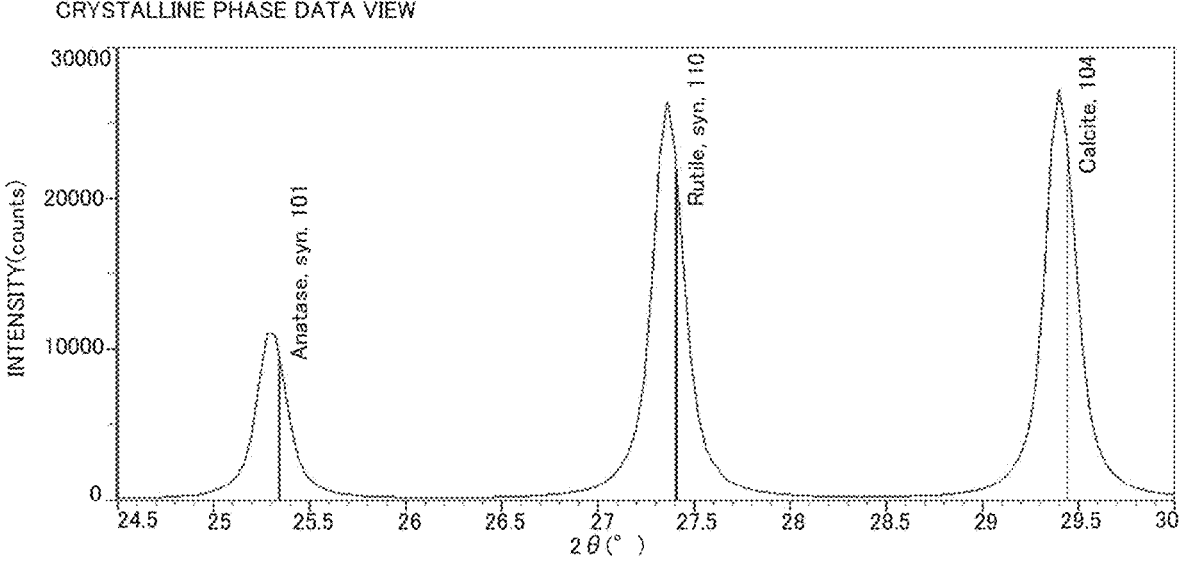
FIG. 10A and FIG. 10B are diagrams showing the profiles without and with correction and the peak positions of the data base, respectively.
Figure 10B:
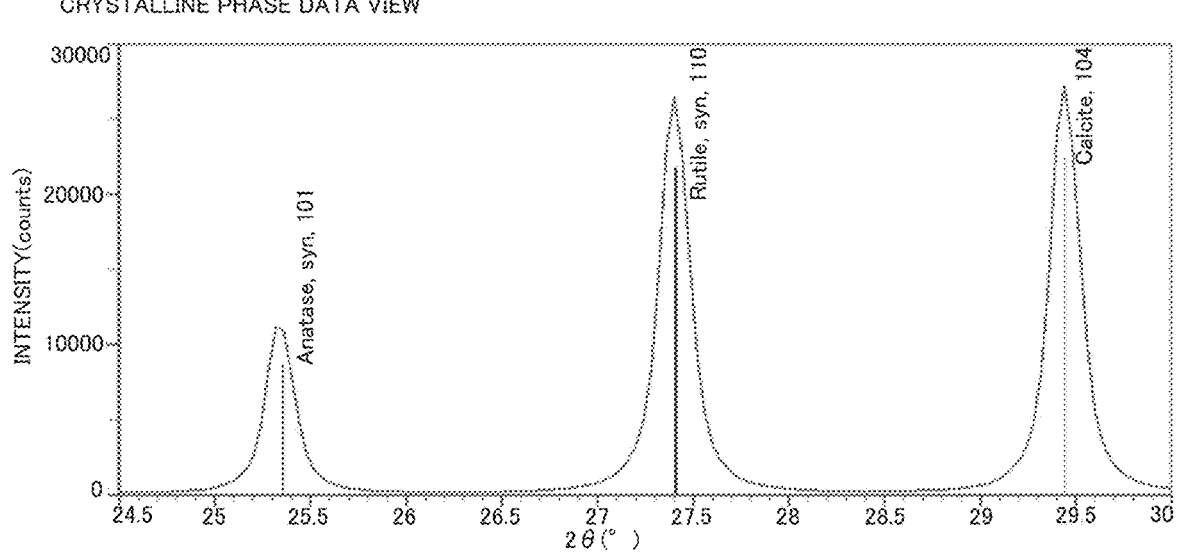

The prepared measurement profile was displayed on the graph with the peak position of the database without correction. On the other hand, the prepared measurement profile was corrected by the above-described correction method, and the corrected profile was displayed on a graph together with the peak position of the database. FIGS. 10A and 10B are diagrams showing the profiles without and with the correction and the peak positions of the data base, respectively.

In each figure, the peak positions of the database are indicated by bars. The peak positions of the uncorrected profile deviate from the bar positions. However, the peak positions of the profile with correction coincide with the positions of the bar. From this result, it can be seen that if the height of the sample surface deviates from the reference position by 100 μm, an incorrect card can be cited as a candidate in the qualitative analysis.

[Simulation 2]

The component decomposition of the measurement profiles of a plurality of powder samples having the same types of crystalline phases and different content ratios ideally results in single phase profiles of the crystalline phases contained. In simulation 2, the following procedure was performed to simulate the effect of the height deviation of the sample surface on the accuracy of the component decomposition.

Firstly, 21 profiles were produced in which three crystalline phases, anatase, calcite and rutile, were mixed in different weight ratios. Next, for 21 profiles, a profile in which the sample height was shifted was prepared. As a specific height deviation amount, the height deviation of the i-th data was set to be $100-10*i\mu m$ (i=0, 1, . . . , 20). Finally, the component decomposition was carried out for 21 profiles with height deviation and 21 profiles without height deviation, respectively, and it was examined whether the single phase profile of anatase could be extracted.

Figures 11A, 11B:
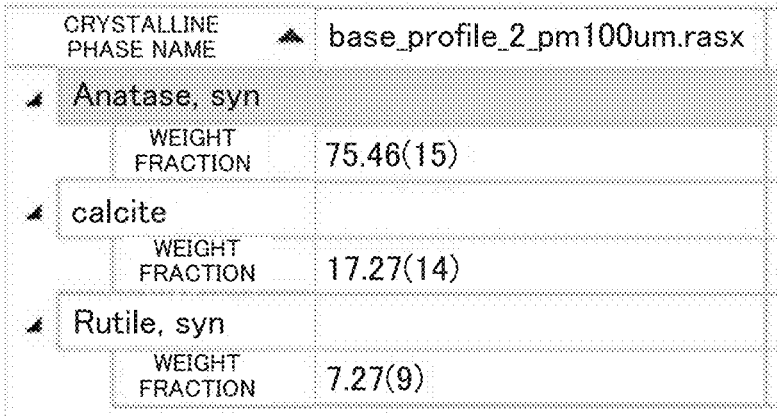
FIG. 11A and FIG. 11B are tables showing the compositions of profile positions of mixed samples with and without height deviation, respectively.
Figure 12:
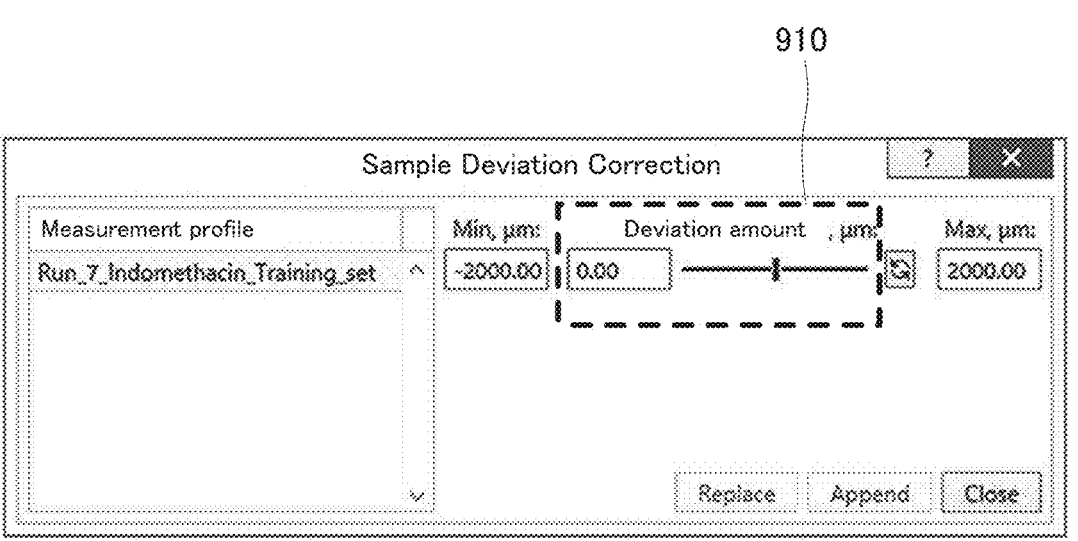
FIG. 12 is a diagram showing a dialog box used in correcting a sample position.

FIGS. 11A and 11B are tables showing the compositions of profile positions of mixed samples with and without height deviation, respectively. "base_profile_2_pm 100 um" is a profile extracted from the data with the height deviation. "base_profile_2" is a profile extracted from the data without the height deviation. Regarding anatase as the main phase of "base_profile_2", the weight fraction is 75.46% with height deviation, whereas the weight fraction is 88.2 without height deviation. Thus, the weight fraction in the case with the height deviation was significantly different from the weight fraction in the case without the height deviation. This is because peaks other than anatase belong to "base_profile_2". In this way, when there is a deviation in the height of the sample surface, the accuracy of the component decomposition is lowered, and thus the correction of the height of the sample surface is effective.

When the component decomposition is performed without correcting the height of the sample surface with respect to the profile, peaks due to other crystalline phases may be added to a specific basis profile. In this case, when qualitative analysis is performed using the basis profile, the number of crystalline phase candidates increases, and an inaccurate value is calculated as the weight fraction of each crystalline phase. The simulation results show that, in quantification using the basis profile, the quantitative values are not accurate in the profile to which the peaks due to different crystalline phases are attributed.

This application claims priority from Japanese Patent Application No. 2023-151710, filed on Sep. 19, 2023, the entire contents of Japanese Patent Application No. 2023-151710 are incorporated herein by reference.

DESCRIPTION OF SYMBOLS

100 X-ray diffraction measurement system
200 X-ray diffraction apparatus

210 X-ray generating section
220 incident side optical unit
230 goniometer
240 sample stage
250 emitting side optical unit
260 detector
300 control apparatus
310 control section
320 apparatus information storing section
330 measurement data storing section
340 display section (control apparatus side)
400 correction apparatus
410 measurement profile acquiring section
420 reference profile setting section
425 subject profile setting section
430 estimation method setting section
435 temporary correction section
440 correction amount estimating section
450 display section (correction apparatus side)
460 correction section
510 input device
520 display device
601 profile name
602 previous correction amount
603 current correction amount
610 check box
620 estimation start button
910 operation area

What is claimed is:

1. A correction apparatus for correcting a profile of X-ray powder diffraction, comprising:
   processing circuitry configured to
   set a reference profile,
   set an estimation method for estimating a correction amount related to a sample height,
   estimate the correction amount based on the estimation method, and
   correct a subject profile based on the correction amount, wherein
   the correction amount is a value that maximizes a degree of coincidence between the corrected subject profile and the reference profile.

2. The correction apparatus according to claim 1, wherein the processing circuitry is further configured to
   correct the subject profile with a temporary correction amount, and
   calculate the correction amount by repeating evaluation of a degree of coincidence between the subject profile corrected based on the temporary correction amount and the reference profile.

3. The correction apparatus according to claim 1, wherein the processing circuitry is further configured to
   set the reference profile based on a profile designated by a user.

4. The correction apparatus according to claim 1, wherein the processing circuitry is further configured to
   set the reference profile calculated based on a plurality of profiles.

5. The correction apparatus according to claim 1, wherein the processing circuitry is further configured to
   set a least-square method or a peak-top method as the estimation method.

6. The correction apparatus according to claim 1, wherein the processing circuitry is further configured to
   set a 2θ angle range in which the degree of coincidence is maximized based on a designation of a user.

7. The correction apparatus according to claim 1, wherein the processing circuitry is further configured to display a profile obtained by correcting the subject profile based on the temporary correction amount or the correction amount.

8. The correction apparatus according to claim 2, where the processing circuitry is further configured to display a profile obtained by correcting the subject profile based on the temporary correction amount.

9. The correction apparatus according to claim 1, wherein the following formula (1) is used based on the goniometer radius R and the correction amount D relating to the sample height when the angle 2θ of the profile is converted into the corrected angle 2θcorr.

$$2\theta_{corr} = 2\theta - (2D/R)\cos\theta \qquad (1)$$

10. The correction apparatus according to claim 1, wherein a target of qualitative analysis is generated by correcting the subject profile based on the correction amount.

11. The correction apparatus according to claim 1, wherein a target of component decomposition is generated by correcting the subject profile based on the correction amount.

12. A correction method for correcting a profile of X-ray powder diffraction, comprising the steps of:

setting a reference profile, setting an estimation method for estimating a correction amount related to a sample height, estimating the correction amount based on the estimation method, and correcting a subject profile based on the correction amount, wherein the correction amount is a value that maximizes a degree of coincidence between the corrected subject profile and the reference profile.

13. A non-transitory computer-readable recording medium having recorded thereon computer-readable instructions for correcting a profile of X-ray powder diffraction which, when executed by a computer, cause the computer to perform a method, the method comprising:

setting a reference profile, setting an estimation method for estimating a correction amount related to a sample height, estimating the correction amount based on the estimation method, and correcting a subject profile based on the correction amount, wherein the correction amount is a value that maximizes a degree of coincidence between the corrected subject profile and the reference profile.

* * * * *